US012651857B2

(12) United States Patent
Fan et al.

(10) Patent No.: US 12,651,857 B2
(45) Date of Patent: Jun. 9, 2026

(54) CARD EDGE CONNECTOR WITH COMPACT, ROBUST LATCH

(71) Applicant: Amphenol Commercial Products (Chengdu) Co., Ltd., Chengdu (CN)

(72) Inventors: Jun Fan, Chengdu (CN); Tao Zeng, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 681 days.

(21) Appl. No.: 18/101,987

(22) Filed: Jan. 26, 2023

(65) Prior Publication Data

US 2023/0246361 A1 Aug. 3, 2023

(30) Foreign Application Priority Data

Jan. 29, 2022 (CN) ......................... 202210112189.8
Jan. 29, 2022 (CN) ......................... 202220244658.7
(Continued)

(51) Int. Cl.
*H01R 12/72* (2011.01)
*H01R 12/70* (2011.01)
(Continued)

(52) U.S. Cl.
CPC ....... *H01R 12/721* (2013.01); *H01R 12/7005* (2013.01); *H01R 13/6272* (2013.01); *H01R 13/631* (2013.01); *H01R 13/516* (2013.01)

(58) Field of Classification Search
CPC .............. H01R 12/721; H01R 12/7017; H01R 12/7011
(Continued)

(56) References Cited

U.S. PATENT DOCUMENTS 5,443,394 A * 8/1995 Billman ............. H01R 12/7005 439/328
6,113,404 A * 9/2000 Choy ................. H01R 13/6335 439/160
(Continued)

FOREIGN PATENT DOCUMENTS

CN 204696279 U 10/2015
CN 204696358 U 10/2015
(Continued)

*Primary Examiner* — Marcus E Harcum
(74) *Attorney, Agent, or Firm* — Wolf, Greenfield & Sacks, P.C.

(57) ABSTRACT

A card edge connector with a latch non-removably retained to a housing so as to improve the connector's reliability. The housing has a slot elongated in a longitudinal direction and is configured to hold conductive elements. Each conductive element has a contact portion exposed in the slot configured for mating with an electronic component, and a tail portion extending out of the housing configured for surface mounting to another electronic component. The housing has an end portion at an end of the slot in the longitudinal direction. The latch is installed to and extends around three sides of the end portion of the housing. The latch has a first retention feature, and the end portion has a second retention feature. When the first retention feature fully engages the second retention feature, the latch cannot be removed from the housing in a non-destructive manner. The latch and the housing may be made of different materials for respective functions.

20 Claims, 6 Drawing Sheets

(30) Foreign Application Priority Data

Apr. 6, 2022 (CN) ......................... 202210355103.4
Apr. 6, 2022 (CN) ......................... 202220777354.7

(51) Int. Cl.
*H01R 13/627* (2006.01)
*H01R 13/631* (2006.01)
*H01R 13/516* (2006.01)

(58) Field of Classification Search
USPC .................................................. 439/160, 327
See application file for complete search history.

(56) References Cited

U.S. PATENT DOCUMENTS

| | | | | |
|---|---|---|---|---|
| 6,361,344 | B1 * | 3/2002 | Yu | H01R 12/7005 439/328 |
| 6,368,124 | B1 * | 4/2002 | Wang | H01R 12/7005 439/153 |
| 6,767,230 | B2 * | 7/2004 | Lai | H01R 12/7029 439/153 |
| 6,824,413 | B1 * | 11/2004 | Shipe | H01R 12/7005 439/157 |
| 7,029,300 | B2 * | 4/2006 | Tsai | H01R 12/7005 439/160 |
| 7,083,448 | B2 * | 8/2006 | Tanigawa | H01R 13/6335 439/328 |
| 7,121,862 | B2 * | 10/2006 | Tang | H01R 12/7005 439/327 |
| 7,677,907 | B2 * | 3/2010 | Guan | H01R 12/721 439/157 |
| 7,866,995 | B1 * | 1/2011 | Kudo | H01R 12/7005 439/157 |
| 7,988,480 | B2 * | 8/2011 | Yao | H01R 12/7011 439/329 |
| 8,052,450 | B2 * | 11/2011 | Li | H01R 12/7005 439/153 |
| 8,235,738 | B2 * | 8/2012 | Li | H01R 13/639 439/347 |
| 8,622,763 | B2 * | 1/2014 | Fu | H01R 12/737 439/328 |
| 9,240,639 | B2 * | 1/2016 | Tang | H01R 13/62988 |
| 10,276,976 | B1 * | 4/2019 | Phillips | H01R 13/629 |
| 2003/0148646 | A1 * | 8/2003 | Frantum, Jr. | H01R 12/7005 439/157 |
| 2005/0153585 | A1 * | 7/2005 | Bu | H01R 12/721 439/79 |
| 2008/0318448 | A1 * | 12/2008 | Ringler | H01R 13/6275 439/78 |
| 2009/0186502 | A1 * | 7/2009 | Chen | H01R 12/721 439/157 |
| 2010/0062647 | A1 * | 3/2010 | Yang | H01R 12/7076 439/630 |
| 2011/0053400 | A1 * | 3/2011 | Li | H01R 12/7005 439/327 |
| 2011/0065297 | A1 * | 3/2011 | Guan | H01R 12/721 439/325 |
| 2011/0104926 | A1 * | 5/2011 | Li | H01R 12/737 439/327 |
| 2011/0104952 | A1 * | 5/2011 | Teh | H01R 12/737 439/633 |
| 2013/0040482 | A1 * | 2/2013 | Ngo | H01R 12/7023 439/328 |
| 2013/0084723 | A1 * | 4/2013 | Shen | H01R 12/7029 439/159 |
| 2014/0220809 | A1 * | 8/2014 | Yu | H01R 13/6273 439/358 |
| 2014/0363994 | A1 * | 12/2014 | Li | H01R 12/7029 439/160 |
| 2018/0102608 | A1 * | 4/2018 | Sun | H01R 12/721 |
| 2019/0020132 | A1 * | 1/2019 | Phillips | H01R 12/7023 |
| 2019/0027852 | A1 * | 1/2019 | Motoyama | H01R 13/639 |
| 2020/0388962 | A1 * | 12/2020 | Geng | H01R 13/635 |
| 2021/0344134 | A1 * | 11/2021 | Racho | H01R 12/721 |

FOREIGN PATENT DOCUMENTS

| | | |
|---|---|---|
| CN | 105720400 A | 6/2016 |
| CN | 106207538 A | 12/2016 |

* cited by examiner

CARD EDGE CONNECTOR WITH COMPACT, ROBUST LATCH

RELATED APPLICATIONS

This application claims priority to and the benefit of Chinese Patent Application Serial No. 20220777354.7, filed on Apr. 6, 2022, entitled "CARD EDGE CONNECTOR WITH ROBUST LATCH AND ELECTRONIC SYSTEM." This application also claims priority to and the benefit of Chinese Patent Application Serial No. 202210355103.4, filed on Apr. 6, 2022, entitled "CARD EDGE CONNECTOR WITH ROBUST LATCH AND ELECTRONIC SYSTEM." This application also claims priority to and the benefit of Chinese Patent Application Serial No. 202220244658.7, filed on Jan. 29, 2022, entitled "CARD EDGE CONNECTOR WITH ROBUST LATCH AND ELECTRONIC SYSTEM." This application also claims priority to and the benefit of Chinese Patent Application Serial No. 202210112189.8, filed on Jan. 29, 2022, entitled "CARD EDGE CONNECTOR WITH ROBUST LATCH AND ELECTRONIC SYSTEM." The entire contents of these applications are incorporated herein by reference in their entirety.

FIELD

This application relates to electrical connectors, such as those used to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

In some applications, an electrical connector may provide an electrical connection between a first circuit board, such as a daughter card, and a second circuit board, such as a mother board. The conductive elements of such electrical connector may electrically connect conductive portions of the first circuit board to respective conductive portions of the second circuit board. Such an electrical connector may be referred to as a "card edge connector."

A card edge connector typically includes a slot recessed into an insulative housing for inserting a first circuit board, such as a daughter card, and latches pivotably mounted at both end portions of the insulative housing. The latches are conventionally configured to pivot about rotation axes between a locked position for locking the first circuit board in the slot and an unlocked position for removing the first circuit board from the slot.

BRIEF SUMMARY

Aspects of the present disclosure relate to provide card edge connectors with compact, robust latches.

Some embodiments relate to an electrical connector. The electrical connector may include a housing comprising a slot extending in a longitudinal direction and an end portion at an end of the slot in the longitudinal direction; a plurality of conductive elements held in the housing, each of the plurality of conductive elements comprising a contact portion exposed in the slot and a tail portion extending out of the housing; and a latch comprising a body non-removably retained to the end portion of the housing, and a beam comprising a proximal end joining the body and a distal end.

Optionally, the body of the latch may comprise a first sidewall, a second sidewall, an end wall joining the first sidewall and the second sidewall, and a first retention feature; the end portion of the housing may be at least partially enclosed by the first sidewall, second sidewall, and end wall of the body of the latch; and the end portion of the housing may comprise a second retention feature configured to engage the first retention feature of the body of the latch so as to non-removably retain the body of the latch to the end portion of the housing.

Optionally, the housing may comprise a mating face and a mounting face, the slot may open through the mating face, and the tail portions of the plurality of conductive elements may extend out of the mounting face; and the first retention feature of the latch may comprise a rib protruding from the first sidewall and disposed above the mounting face, and the rib may comprise a stepped portion disposed below the mating face.

Optionally, the second retention feature of the housing may comprise a groove configured to receive the rib of the first retention feature; and the rib of the first retention feature of the latch may comprise a chamfered or rounded portion configured to guide the rib of the first retention feature of the latch into the groove of the second retention feature of the housing.

Optionally, the first retention feature of the latch may comprise a rib protruding from the second sidewall; and the rib protruding from the first sidewall and the rib protruding from the second sidewall may be in reflection symmetry.

Optionally, the first retention feature may comprise a first platform protruding from the end wall; and the housing may comprise a second platform protruding outward from the end portion and configured to engage the first platform of the first retention feature.

Optionally, the first platform may comprise a first stop face and a tab protruding from the first stop face; the second platform may comprise a second stop face and a recess into the second platform from the second stop face; and the tab of the first platform and the recess of the second platform may be configured to engage each other when the first stop face engages the second stop face.

Optionally, the first retention feature may comprise a first additional rib protruding from the first sidewall and aligned with the rib in a mating direction perpendicular to the longitudinal direction, and a second additional rib protruding from the first sidewall and offset from the rib in the mating direction; and the second retention feature may comprise matching additional grooves configured to receive the first additional rib and the second additional rib, respectively.

Optionally, the beam may comprise a protrusion extending from a first side of the beam and having a chamfered face; and the beam may comprise a curved face on a second side opposite the first side and extending between the proximal end and the protrusion.

Optionally, the beam may be a first beam; the latch may comprise a second beam configured to protect the first beam from excessive deformation; and the second beam may comprise a proximal end joining the body of the latch and a distal end aligned with the protrusion of the first beam in a direction perpendicular to the longitudinal direction.

Some embodiments relate to a method of manufacturing an electrical connector comprising a housing comprising a slot extending in a longitudinal direction and an end portion at an end of the slot in the longitudinal direction, a plurality of conductive elements held in the housing, each of the plurality of conductive elements comprising a contact portion exposed in the slot and a tail portion extending out of the housing, and a latch comprising a first sidewall, a second sidewall, an end wall joining the first sidewall and the second sidewall, and a beam comprising a proximal end joining the body and a distal end. The method may include aligning the latch with the end portion of the housing such that the first sidewall, the second sidewall, and the end wall of the latch at least partially enclosing the end portion of the housing when the latch is installed to the housing; and engaging the latch with the end portion of the housing until that the latch cannot be removed from the end portion of the housing in a non-destructive manner.

Optionally, engaging the latch with the end portion of the housing may comprise sliding the latch in a mating direction perpendicular to the longitudinal direction.

Optionally, engaging the latch with the end portion of the housing may comprise engaging a first retention feature of the latch with a second retention feature of the end portion of the housing.

Optionally, engaging the first retention feature of the latch with the second retention feature of the end portion of the housing may comprise sliding a chamfered portion of the first retention feature of the latch into the second retention feature of the end portion of the housing; and fitting a stepped portion of the first retention feature of the latch into a corresponding portion of the second retention feature of the end portion.

Some embodiments relate to an electrical connector. The electrical connector may include a housing comprising a slot extending in a longitudinal direction and an end portion disposed at an end of the slot in the longitudinal direction; a plurality of conductive elements held in the housing, each of the plurality of conductive elements comprising a contact portion exposed in the slot and a tail portion extending out of the housing; and a latch comprising a body retained to the end portion of the housing, and a beam comprising a proximal end joining the body and a distal end, wherein the housing and the latch may be made of different materials, a first material of the housing may be more rigid than a second material of the latch, and both the first material and the second material may have melting points no less than 260° C.

Optionally, the first material may have a flexural modulus of not less than 10 GPa; and the second material may have a flexural modulus of not more than 7.5 GPa.

Optionally, the second material may have a tensile elongation of not more than 7%.

Optionally, the tail portions of the plurality of conductive elements may be configured for surface mount.

Optionally, the second material may be GF 20% reinforced PA46.

Optionally, the body of the latch may comprise a space configured to receive the end portion of the housing and a first retention feature protruding into the space; and the end portion of the housing may comprise a second retention feature configured to engage the first retention feature so as to non-removably retain the latch to the housing.

Some embodiments relate to a card edge connector. The card edge connector may comprise: an insulative housing extending in a longitudinal direction, the insulative housing including two opposite end portions in the longitudinal direction, and a slot recessed into the insulative housing in a mating direction perpendicular to the longitudinal direction from a first face of the insulative housing and extending between the two end portions, the slot configured for receiving a circuit board; a plurality of conductive elements held in the insulative housing with contact portions thereof exposed in the slot for establishing an electrical connection with a corresponding conductive portion of the circuit board when the circuit board is inserted into the slot; and at least one latch for locking and unlocking the circuit board when the circuit board is inserted into the slot, wherein each of the at least one latch is configured to be mounted to the insulative housing at a corresponding end portion of the two end portions, and includes a body, the body includes a slot recessed into the body from a first side of the body and defining a first receiving space, and a first retention feature protruding into the first receiving space from the body, the slot is configured for receiving the corresponding end portion in the first receiving space; wherein the insulative housing may include a second retention feature formed at the corresponding end portion and configured to cooperate with the first retention feature, the first retention feature and the second retention feature are configured to cooperate with each other to non-removably retain the latch to the insulative housing when the latch is moved from the first face along the mating direction to cause the corresponding end portion to enter the slot and slide a predetermined distance in the slot.

Optionally, the slot may extend along a first direction and include mutually opposed first and second inner sidewalls and an end wall connecting the first and second inner sidewalls, the slot may be configured to allow the corresponding end portion to enter the slot when the latch is oriented with the first direction being substantially parallel to the mating direction.

Optionally, the first retention feature may include a first rib and a second rib protruding into the first receiving space from the first inner sidewall and the second inner sidewall, respectively, and the first rib and the second rib may extend parallelly to the first direction, respectively; the second retention feature may include a first groove and a second groove recessed into the insulative housing at the corresponding end portion; and when the corresponding end portion enters the slot and slides the predetermined distance in the slot, the first rib may be received in the first groove and the second rib may be received in the slot, so as to form an upper stop for blocking the latch from moving back in the mating direction.

Optionally, each of the first rib and the second rib may include a leading end, a trailing end opposite to the leading end, and a rib body extending between the leading end and the trailing end, the leading end is closer to an access of the slot than the trailing end, such that when the corresponding end portion enters the slot and slides in the slot, the leading end enters a corresponding groove of the first groove and the second groove before the trailing end, wherein shapes of the trailing end and the corresponding groove may be configured restrain the trailing end from moving back out of the corresponding groove after the trailing end enters the corresponding groove.

Optionally, the trailing end may have a stepped portion.

Optionally, the leading end may have a chamfered or rounded portion configured to facilitate entry into the corresponding groove.

Optionally, the first rib and the second rib may be arranged in reflection symmetry.

Optionally, the first retention feature may include a first platform protruding into the first receiving space from the end wall; the insulative housing may include a second face opposite to the first face in the mating direction, and two end portion may face opposite to each other in the longitudinal direction and located at the two end portions, respectively, the corresponding end portion may include a second platform protruding outward from a portion of a corresponding end portion face of the two end portion faces proximate to the second face; the first platform and the second platform may be configured to cooperate with each other when the corresponding end portion enters the slot and slides the predetermined distance in the slot, so as to form a lower stop for blocking the latch from moving further forward in the mating direction.

Optionally, the first platform may include a first stop face and the second platform may include a second stop face, when the first platform and the second platform cooperate with each other, the first stop face and the second stop face may be mutually opposed and in contact with each other to block the latch from moving further forward in the mating direction.

Optionally, the first platform may include a first tab protruding from the first stop face, and the second platform may include a first recess recessed into the second platform from the second stop face, the first tab and the first recess may be configured such that the first tab is received in the first recess when the first platform and the second platform cooperate with each other, so as to enhance a retention of the latch to the insulative housing.

Optionally, the first platform may include a second recess recessed into the first platform from the first stop face, and the second platform may include a second tab protruding from the second stop face, the second tab and the second recess may be configured such that the second protrusion is received in the second recess when the first platform and the second platform cooperate with each other, so as to enhance a retention of the latch to the insulative housing.

Optionally, the first retention feature may include at least one first additional rib protruding into the first receiving space from at least one of the first inner sidewall and the second inner sidewall, each of the at least one first additional rib may extend parallelly to the first direction, the second retention feature may include at least one first additional groove recessed into the insulative housing at the corresponding end portion, each of the at least one first additional rib and a corresponding one of the at least one first additional groove may be configured to cooperate with each other when the corresponding end portion enters the slot and slides the predetermined distanced in the slot, so as to enhance a retention of the latch to the insulative housing.

Optionally, the at least one first additional rib may include two first additional ribs protruding into the first receiving space from the first inner sidewall and the second inner sidewall, respectively, the first rib may protrude into the first receiving space from a top of one of the first additional ribs, and the second rib may protrude into the first receiving space from a top of the other of the two first additional ribs, the at least one first additional groove may include two first additional grooves, the first groove and the second groove may be recessed into the insulative housing from a bottom of a corresponding additional groove of the two first additional grooves, respectively.

Optionally, the first retention feature may include at least one second additional rib protruding into the first receiving space from at least one of the first inner sidewall and the second inner sidewall, each of the at least one second additional rib may extend parallelly to the first direction, the second retention feature may include at least one second additional groove recessed into the second platform, each of the at least one second additional rib and a corresponding one of the at least one second additional groove may be configured to cooperate with each other when the corresponding end portion enters the slot and slide the predetermined distance in the slot, so as to enhance a retention of the latch to the insulative housing.

Optionally, the insulative housing may include a third face and a fourth face opposite to each other in a transverse direction perpendicular to the longitudinal direction and the mating direction, the third face and the fourth face may connect the two end portion faces, the first face and the second face, respectively, the slot may also extend between the third face and the fourth face, the corresponding end portion of the two end portions may be defined by a corresponding one of the two end portion faces, a portion of the third face proximate to the corresponding end portion face, and a portion of the fourth face proximate to the corresponding end portion face.

Optionally, the body may include a top face and a bottom face opposite to each other in the first direction, and the slot may extend through the body along the first direction from the top face to the bottom face.

Optionally, the latch may include a primary beam cantilevered from a second side of the body opposite to the first side, the second side and the primary beam may together define a second receiving space, the circuit board may include a locking portion having a first surface, and a notch recessed into the locking portion from the first surface, the locking portion may be configured to be positioned in the second receiving space with the first surface facing the primary beam when the circuit board is inserted into the slot, the primary beam may include a locking protrusion protruding into the second receiving space from the primary beam, the primary beam may be configured to be biased from a rest position to a biased position by a force, and to return to the rest position from the biased position under the action of its own resiliency when the force is withdrawn, wherein when the primary beam is in the rest position, the locking protrusion may be positioned in the notch to cooperate with the notch to block the circuit board from being pulled out of the slot in the mating direction, and when the primary beam is in the biased position, the locking protrusion may be positioned to exit from the notch, thereby allowing the circuit board to be pulled out of the slot in the mating direction.

Optionally, the locking protrusion may have a protruding tip configured to exit from the notch after remaining portions of the locking projection when the primary beam is biased from the rest position to the biased position, and to enter the notch before the remaining portions of the locking projection when the primary beam returns to the rest position from the biased position, the protruding tip may be formed with a first chamfered portion defined by a first chamfer face, the first chamfer face may be inclined relative to the first surface when the primary beam is in the rest position, the first chamfered face may be substantially parallel to and coplanar with the first surface when the primary beam is in the biased position, and the angle between the first chamfered face and the first surface may gradually become smaller when the primary beam is biased from the rest position to the biased position.

Optionally, a section of the primary beam between the body and the locking protrusion may be curved in a direction away from the second receiving space.

Optionally, the latch may further comprise a assistant beam cantilevered from the second side on a side of the primary beam facing away from the second receiving space, the assistant beam may be configured to restrain the primary beam from being further biased after the primary beam is biased from the rest position to the biased position.

Some embodiments relate to a card edge connector. The card edge connector may comprise: an insulative housing extending in a longitudinal direction, the insulative housing including two opposite end portions in the longitudinal direction, and a slot recessed into the insulative housing in a mating direction perpendicular to the longitudinal direction and extending between the two end portions, the slot configured for receiving a first circuit board; a plurality of conductive elements held in the insulative housing with contact portions thereof exposed in the slot for establishing an electrical connection with a corresponding conductive portion of the first circuit board when the first circuit board is inserted into the slot; and at least one latch for locking and unlocking the first circuit board when the first circuit board is inserted into the slot, wherein each of the at least one latch may be configured to be mounted to the insulative housing at a corresponding end portion of the two end portions; wherein the insulative housing may be more rigid than the latch.

Optionally, the insulative housing may be formed from a material with a flexural modulus of not less than 10 GPa, and the latch may be formed from a material with a flexural modulus of not more than 7.5 GPa.

Optionally, the latch may be formed from a material with a tensile elongation of not more than 7%.

Optionally, the card edge connector may be configured to be mounted to a second circuit board through a surface mount technology, both the insulative housing and the latch may be configured for withstanding a temperature of at least 260° C.

Optionally, the latch may be made from GF 20% reinforced PA46.

Optionally, the slot may be recessed into the insulative housing from a first face thereof, the latch may include a body, the body may include a slot recessed into the body from a first side of the body and defining a first receiving space, and a first retention feature protruding into the first receiving space from the body, the slot may be configured for receiving the corresponding end portion in the first receiving space, the insulative housing may include a second retention feature formed at the corresponding end portion and configured to cooperate with the first retention feature, the first retention feature and the second retention feature may be configured to cooperate with each other to non-removably retain the latch to the insulative housing when the latch is moved from the first face along the mating direction to cause the corresponding end portion to enter the slot and slide a predetermined distance in the slot.

Some embodiments relate to a card edge connector. The card edge connector may comprise: an insulative housing extending in a longitudinal direction, the insulative housing including two opposite end portions in the longitudinal direction, and a slot recessed into the insulative housing in a mating direction perpendicular to the longitudinal direction and extending between the two end portions, the slot configured for receiving a first circuit board; a plurality of conductive elements held in the insulative housing with contact portions thereof exposed in the slot for establishing an electrical connection with a corresponding conductive portion of the first circuit board when the first circuit board is inserted into the slot; and at least one latch for locking and unlocking the first circuit board when the first circuit board is inserted into the slot, wherein each of the at least one latch may be configured to be mounted to the insulative housing at a corresponding end portion of the two end portions; wherein the insulative housing may be formed of a first material and the latch may be formed of a second material, the first material may be more rigid than the second material, each of the first material and the second material may have a melting point of not less than 260° C.

Optionally, the first material may have a flexural modulus of not less than 10 GPa, and the second material may have a flexural modulus of not more than 7.5 GPa.

Optionally, the second material may have a tensile elongation of not more than 7%.

Optionally, the card edge connector may be configured to be mounted to a second circuit board through a surface mount technology.

Optionally, the second material may be GF 20% reinforced PA46.

Optionally, the slot may be recessed into the insulative housing from a first face thereof, the latch may include a body, the body may include a slot recessed into the body from a first side of the body and defining a first receiving space, and a first retention feature protruding into the first receiving space from the body, the slot may be configured for receiving the corresponding end portion in the first receiving space, the insulative housing may include a second retention feature formed at the corresponding end portion and configured to cooperate with the first retention feature, the first retention feature and the second retention feature may be configured to cooperate with each other to non-removably retain the latch to the insulative housing when the latch is moved from the first face along the mating direction to cause the corresponding end portion to enter the slot and slide a predetermined distance in the slot.

Some embodiments relate to an electronic system comprising card edge connector described herein and a circuit board inserted into the slot and locked in place by at least one latch of the card edge connector.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

LIST OF REFERENCE NUMERALS

Figure 1:
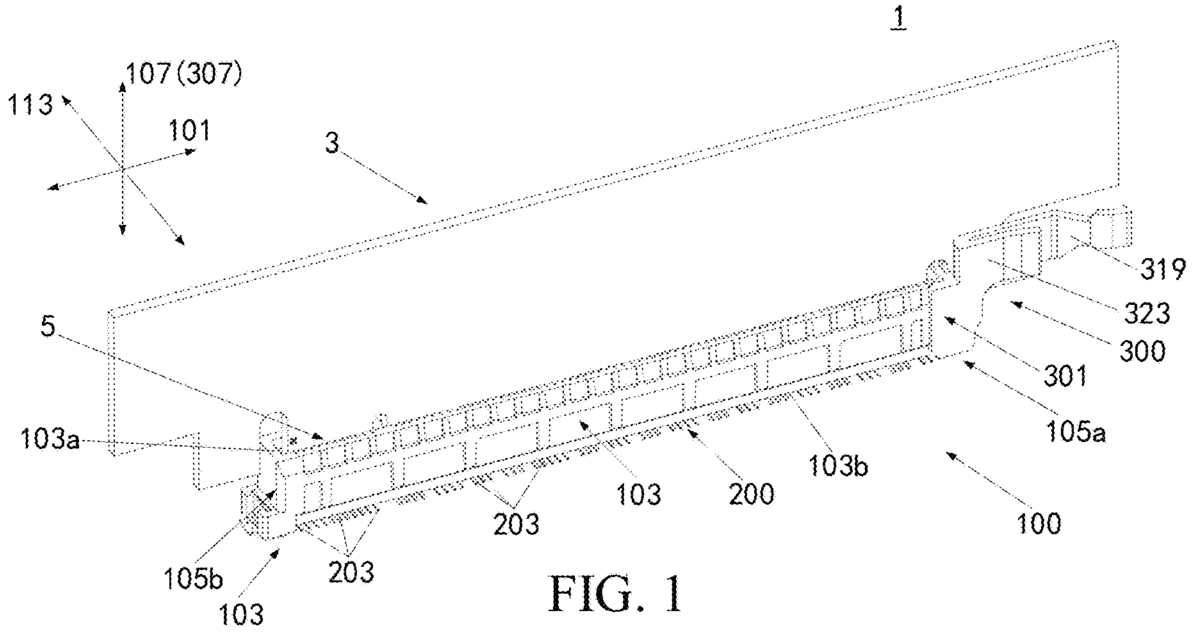
FIG. 1 is a perspective view of an electronic system, showing a card edge connector having a latch in a rest position to secure a first circuit board in a slot of the connector, according to some embodiments.

1 electronic system
3 first circuit board
5 edge portion
7 first conductive portion
11 locking portion
11*a* first surface
11*b* notch
100 card edge connector
101 longitudinal orientation
103 insulative housing
103*a* first face
103*b* second face
103*c*, 103*d* end portion faces
103*e* third face
103*f* fourth face
105*a*, 105*b* end portions
107 mating direction
109 slot
111 second retention feature
113 lateral direction
115*a* first groove
115*b* second groove
117 second platform
117*a* second stop face
117*b* first recess
119*a*, 119*b* first additional groove
121 second additional groove
200 conductive element
201 contact portion
203 tail portion
300 latch
301 body
301*a* first side
301*b* second side
301*c* top face
301*d* bottom face
303 slot
303*a* first inner sidewall
303*b* second inner sidewall
303*c* end wall
303*d* access
305 first retention feature
307 first direction
309*a* first rib
309*b* second rib
311*a* leading end
311*b* trailing end
311*c* rib body
313 first platform
313*a* first stop face
313*b* first tab
315*a*, 315*b* first additional rib
317 second additional rib
319 primary beam
321 locking protrusion
321*a* protruding tip
321*b* first chamfered face
323 assistant beam
S1 first receiving space
S2 second receiving space.

DETAILED DESCRIPTION

The Inventors have recognized and appreciated connector designs to enable more robust electronic systems. The Inventors have recognized and appreciated that conventional connectors have latches designed to be easily separable from housings to which the latches are attached. Conventional connectors, however, may often have latches inadvertently removed from the housings, leaving mating electronic components unsecured in the connectors. Such unsecured interconnections may lead to weaker signals or even loss of signals, for example, when systems having such connectors experience motions in a working environment such as vibration, shaking, etc.

The Inventors have recognized and appreciated connectors with latches non-removably retained to housings so as to improve connector reliability. A connector may include a housing having a slot elongated in a longitudinal direction and configured for receiving an electronic component, and an end portion at an end of the slot in the longitudinal direction. A latch may have a body non-removably retained to the end portion of the housing, a first beam configured to be movable between a rest position for securing the electronic component and a biased position for releasing the electronic component, and a second beam configured for preventing the first beam from over bias.

The body of the latch may extend around three sides of the end portion of the housing. The body of the latch may have a first retention feature extending into a space configured for receiving the end portion of the housing. The end portion of the housing may have a second retention feature configured to match the first retention feature of the body of the latch. The first retention feature and the second retention feature may be configured such that when they fully engage with each other, the latch may not be removed from the housing in a non-destructive manner. Such a configuration may enable a compact, robust latch and therefore reduce the risk of unsecured interconnection between the connector and the electronic component inserted therein.

In some embodiments, the first retention feature may include a rib extending from a first sidewall of the body of the latch into the space configured for receiving the end portion of the housing. The rib may include a first end configured for guiding the rib into a matching groove of the second retention feature of the end portion of the housing, and a stepped portion configured for preventing the rib from disengaging the matching groove when the stepped portion is fitted inside the groove. Such a configuration may therefore prevent the latch from being inadvertently separated from housing.

In some embodiments, the first retention feature may include first and second additional ribs extending from the first sidewall of the body of the latch into the space configured for receiving the end portion of the housing. The first additional rib may be aligned with the rib in a mating direction perpendicular to the longitudinal direction. The second additional rib may be offset from the rib in the mating direction. Such a configuration may improve the strength of the latch in the mating direction and a lateral direction perpendicular to both the longitudinal direction and the mating direction.

In some embodiments, the first retention feature may include a first platform extending from an end wall that joins the first sidewall with a second sidewall away from the space configured for receiving the end portion of the housing. The first platform may have a tab configured for inserting into a matching recess of the end portion of the housing. Such a configuration may block movement of the latch in the mating direction due to forces generated during the initial installation of the latch and the repeated insertions and removals of electronic components into and from the connector.

The first beam of the latch may be configured to sustain repeated movements between the rest position and the biased position. In some embodiments, the first beam may include a protrusion extending from a first side of the first beam and configured to insert into a notch of the electronic component so as to secure the electronic component in the slot of the housing. The protrusion may include a chamfered face configured to reduce a distance needed to move the first beam to the biased position. The protrusion may include a curved face on a second side of the first beam opposite the first side and extending between the proximal end and the protrusion. Such a curved face may improve the ability of the first beam to sustain the repeated movements.

The connector may include conductive elements held in the housing. Each conductive element may have a contact portion exposed in the slot configured for mating with the electronic component inserted therein, and a tail portion extending out of the housing and configured for surface mounting to another electronic component. The Inventors have recognized and appreciated that while both the housing and the latch should sustain the temperature required for surface mounting the connector to the electronic component, the housing and the latch should be configured for respective functions. While the housing should be resistible to deformation, which may be caused by the repeatable insertions and removals of electronic components into and from the slot of the housing, the latch should be flexible and resilient such that it may sustain the repeated movements between the rest position and the biased position.

In some embodiments, the housing and the latch may be made of different materials for respective functions. For example, the housing may be made of a first material, and the latch may be made of a second material different from the first material. In some embodiments, the flexural modulus of the first material may be not less than 10 GPa, and the flexural modulus of the second material may be not more than 7.5 GPa. In some embodiments, the tensile elongation of the second material may be not higher than 7%. In some embodiments, both the first material and the second material may have melting points no less than 260° C.

Figure 2:
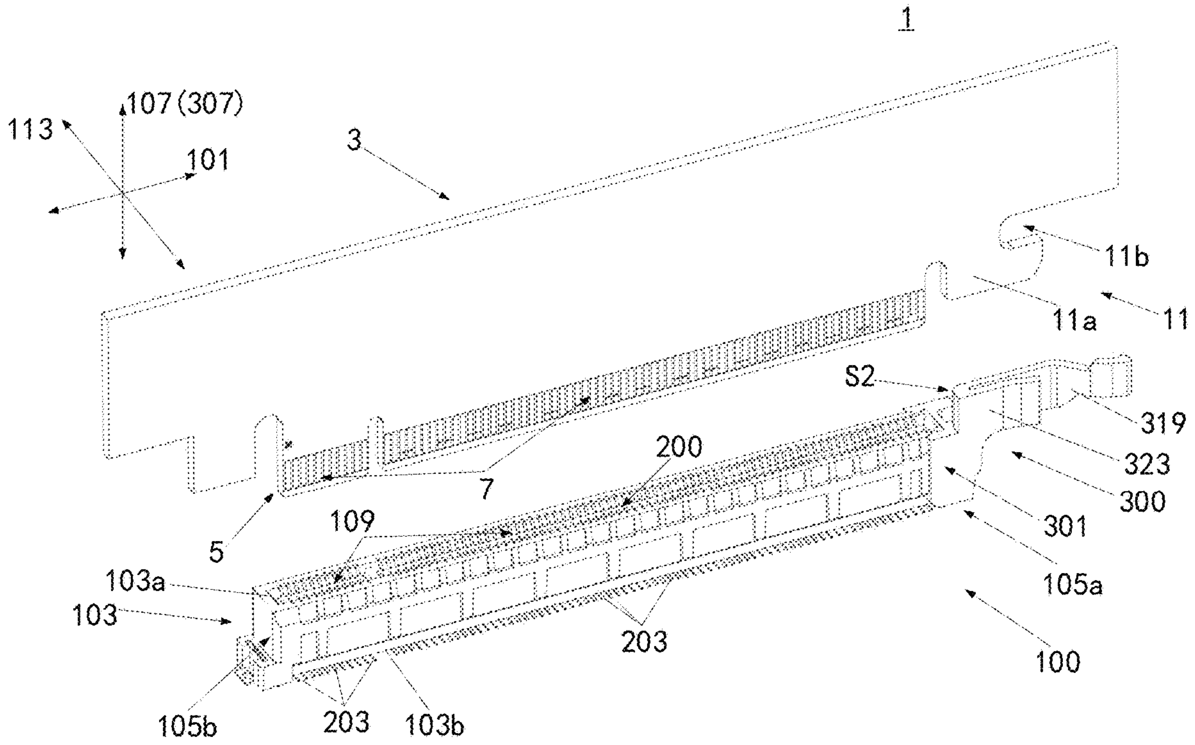
FIG. 2 is a partially exploded view of the electronic system of FIG. 1, showing the first circuit board removed from the card edge connector.

FIGS. 1 and 2 schematically illustrate an electronic system 1 including a card edge connector 100 according to the present disclosure. The electronic system 1 includes a first circuit board 3 such as a daughter card, a second circuit board (not shown) such as a mother board, and the card edge connector 100 configured for establishing an electrical connection between the first circuit board 3 and the second circuit board. As shown in FIG. 2, the first circuit board 3 has a first conductive portion 7 on or near an edge portion 5 thereof. The first conductive portion 7 comprises, for example, a conductive trace or pad on the first circuit board 3.

Figure 3:
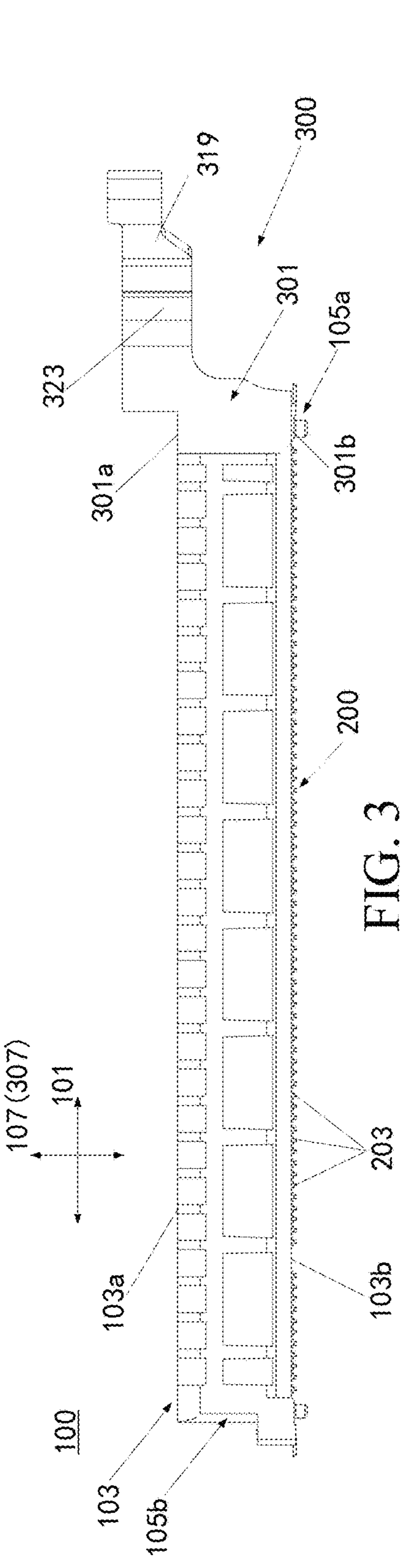
FIG. 3 is a front view of the card edge connector of the electronic system of FIG. 1.
Figure 4:
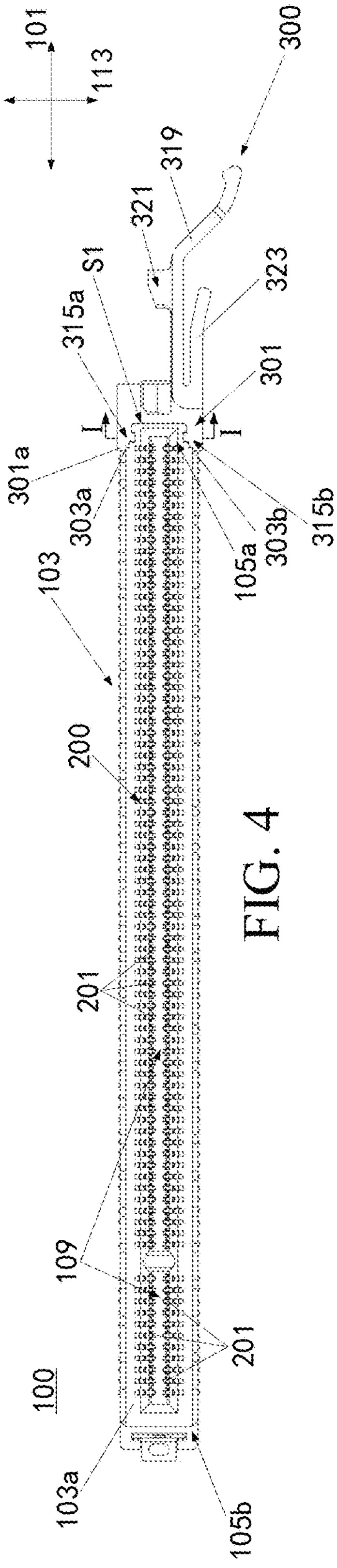
FIG. 4 is a top view of the card edge connector of FIG. 3.
Figure 5:
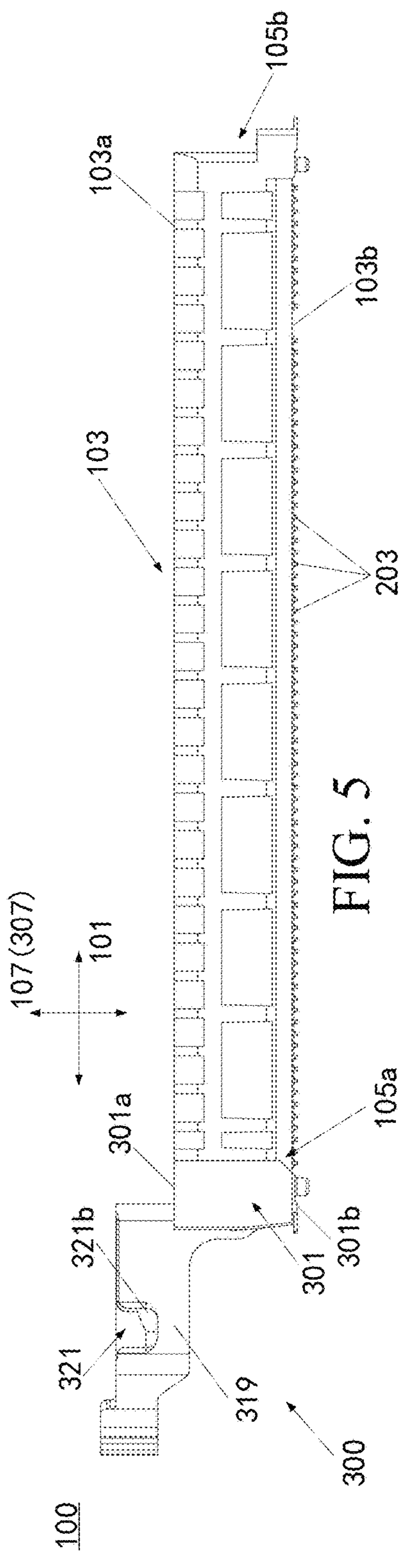
FIG. 5 is a rear view of the card edge connector of FIG. 3.

FIGS. 3 to 5 further illustrate the card edge connector 100, wherein FIG. 3 is a front view of the card edge connector 100, FIG. 4 is a top view of the card edge connector 100, and FIG. 5 is a rear view of the card edge connector 100. With reference to FIGS. 1 and 2 and with further reference to FIGS. 3 to 5, the card edge connector 100 includes an insulative housing 103 extending along a longitudinal direction 101. The insulative housing 103 includes two opposite end portions **105*a* and 105*b* in the longitudinal direction 101, and a slot 109 recessed into the insulative housing 103 from a first face 103*a* (or referred to as a "top face") of the insulative housing 103 along a mating direction 107 perpendicular to the longitudinal direction 101 and extending between the two end portions 105*a* and 105*b*. Examples of insulative materials that are suitable for forming the insulative housing 103** include, but are not limited to, plastic, nylon, liquid crystal polymer (LCP), polyphenyline sulfide (PPS), high temperature nylon or polyphenylenoxide (PPO) or polypropylene (PP).

The slot 109 may be configured to receive the first circuit board 3. The slot 109 may be configured to receive the edge portion 5 of the first circuit board 3. The slot 109 is shown in FIGS. 2 and 5 as including two slot sections, i.e., a first slot section and a second slot section. The second slot section may receive another section of the edge portion 5 of the first circuit board 3 different from the section received by the first slot section. The first slot section and the second slot section may have different lengths along the longitudinal direction 101, and/or the first slot section and the second slot section may have different depths along the mating direction 107. This may provide a dummy-proof function to prevent intentional or unintentional operational errors. It should be appreciated that the slot 109 may include any other numbers of slot sections, such as one slot section or more than two slot sections.

With continuing reference to FIGS. 1 to 5, the card edge connector 100 may include a plurality of conductive elements 200. Each of the plurality of conductive elements 200 may include a contact portion 201, a tail portion 203 opposite to the contact portion 201, and an intermediate portion (not shown) extending between the contact portion 201 and the tail portion 203. Each of the plurality of conductive elements may be formed from a conductive material. The conductive material suitable for forming the plurality of conductive elements may be a metal (e.g., a copper) or a metal alloy (e.g., a copper alloy). The plurality of conductive elements 200 may be retained in the insulative housing 103. As shown in FIGS. 1 to 5, the plurality of conductive elements 200 are arranged in two rows extending along the longitudinal direction 101, respectively, mutually opposed and spaced apart, with the contact portions 201 exposed in the slot 109 for establishing an electrical connection with the first conductive portion 7 of the first circuit board 3 when the first circuit board 3 is inserted in the slot 109, and with the tail portions 203 protruding out of the insulative housing 103 from a second face **103*b* (or referred to as a "bottom face") of the insulative housing 103 opposite to the first face 103*a*. Although the second circuit board is not shown in FIGS. 1 and 2, it should be appreciated that the tail portions 203 may be used to establish an electrical connection with the second circuit board such as a motherboard. For example, the tail portions 203 may be a through-hole contact tail portions or surface mount contact tail portions for establishing an electrical connection with the second (corresponding) conductive portion (such as a conductive trace, pad or through-hole) of the second circuit board. The conductive elements 200 of the card edge connector 100 may electrically interconnect the first conductive portion 7 of the first circuit board 3 and the second conductive portion of the second circuit board by establishing an electrical connection with the first conductive portion 7 and the second conductive portion, respectively, via the conductive elements 200, so as to establish an electrical connection between the first circuit board 3 and the second circuit board. This enables signal transmission (e.g., differential signal transmission) and power transmission between the first circuit board 3** and the second circuit board.

The card edge connector 100 may include at least one latch 300 for locking and unlocking the first circuit board 3 when the first circuit board 3 is inserted into the slot 109. Each of the at least one latch 300 may be configured for mounting to the insulative housing 103 at a corresponding one of the two end portions 105*a* and 105*b* of the insulative housing 103 of the card edge connector 100. As illustrated, each of the at least one latch 300 may include a body 301. The latch 300 can be mounted and secured to the insulative housing 103 by the body 301. As illustrated, the body 301 includes a slot 303 (FIGS. 6 to 8) recessed into the body 301 from a first side 301*a* of the body 301, which may define a first receiving space S1, and a first retention feature 305 protruding into the first receiving space S1 from the body 301. The slot 303 may be configured to receive a corresponding one of the two end portions 105*a* and 105*b* of the insulative housing 103 in the first receiving space S1. The insulative housing 103 of the card edge connector 100 may include a second retention feature 111 formed at the corresponding end portion and configured to cooperate with the first retention feature 305 of the latch 300. The first retention feature 305 of the latch 300 and the second retention feature 111 of the insulative housing 103 may be configured to cooperate with each other to non-removably retain the latch 300 to the insulative housing 103 when the latch 300 is moved from the first face 103*a* of the insulative housing 103 along the mating direction 107 to cause the corresponding end portion to enter the slot 303 and slide a predetermined distance in the slot 303. As used herein, “non-removably” means that the latch 300 cannot be removed in a non-destructive manner, but can only be removed in a destructive manner. For example, the latch 300 being non-removably retained to the insulative housing 103 may mean that if the latch 300 is to be removed from the insulative housing 103, at least the latch 300 would be damaged enough that it would not work as well if tried to use it again. As another example, the latch 300 being non-removably retained to the insulative housing 103 may mean that the latch 300 is affixed to the insulative housing 103 with adhesive, and/or secured with latches. The latches may not be exposed in normal use. The latches may be configured such that if released and reattached, the latches would not hold the part as securely as before.

The above approach enables enhanced securing of the latch 300 to the insulative housing 103, thereby improving reliability of the card edge connector 100 for connecting the first circuit board 3, as will be described in detail below.

Figure 10:
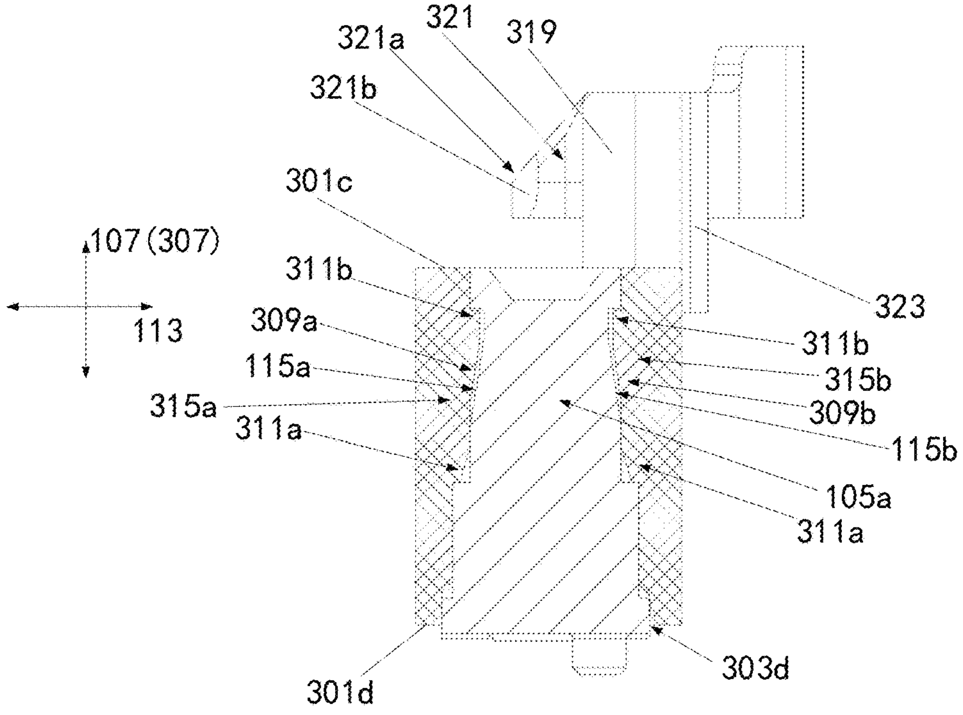
FIG. 10 is a cross sectional view of the card edge connector taken along a line marked "I-I" in FIG. 4.
Figure 11:
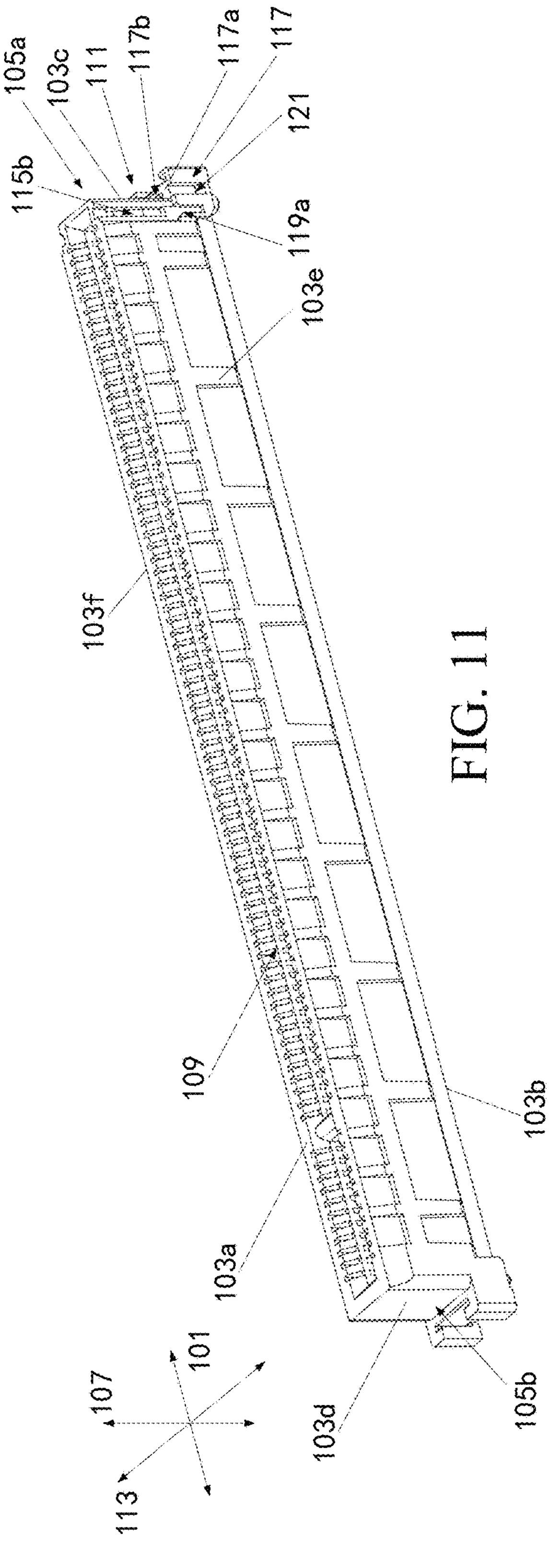
FIG. 11 is a perspective view of the card edge connector of FIG. 3, with the latch hidden.
Figure 12:
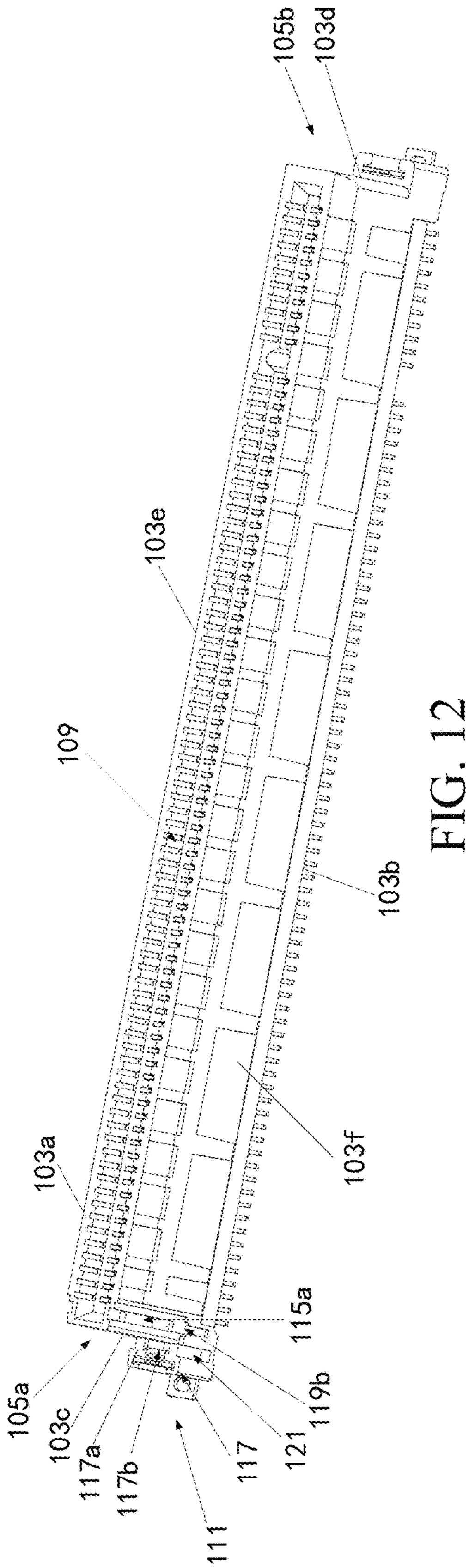
FIG. 12 is another perspective view of the card edge connector of FIG. 11.

FIGS. 11 and 12 further illustrate the card edge connector 100, with the latch 300 hidden to show the end portions 105*a* and 105*b* of the insulative housing 103. As shown in FIGS. 1 to 5, and further as shown in FIGS. 11 and 12, the insulative housing 103 may include a second face 103*b* opposite to the first face 103*a* in the mating direction 107, two opposite end portion faces 103*c* and 103*d* (or referred to as “front face” and “rear face”) in the longitudinal direction 101 and located at the two end portions 105*a* and 105*b*, respectively, and a third face 103*e* and a fourth face 103*f* opposite to each other in a transverse direction 113 perpendicular to the longitudinal direction 101 and the mating direction 107. The third face 103*e* and the fourth face 103*f* connect the two end portion faces 103*c* and 103*d*, the first face 103*a* and the second face 103*b*, respectively. The slot 109 may extend between the third face 103*e* and fourth face 103*f*. With reference to FIGS. 11 and 12, a corresponding end portion of the two end portions 105*a* and 105*b* may be defined by a corresponding end portion face of the two end portion faces 103*c* and 103*d*, a portion of the third face 103*e* proximate to the corresponding end portion face, and a portion of the fourth face 103*f* proximate to the corresponding end portion face. For example, the end portion 105*a* may be defined by the end portion face 103*c*, a portion of the third face 103*e* proximate to the end portion face 103*c*, and a portion of the fourth face 103*f* proximate to the end portion face 103*c*. In the embodiments shown in FIGS. 1 to 15, the second retention feature 111 is formed at the end portion 105*a*, and the latch 300 is mounted to the insulative housing 103 at the end portion 105*a*. However, it should be appreciated that the present application is not limited thereto.

Turning back to FIGS. 1 to 5, when the latch 300 is moved from the first face 103*a* of the insulative housing 103 along the mating direction 107, the end portion 105*a* may enter the slot 303 and slide a predetermined distance in the slot 303. Due to the mutual cooperation of the first retention feature 305 of the latch 300 and the second retention feature 111 of the insulative housing 103, the latch 300 may be non-removably retained to the insulative housing 103. In this case, the end portion 105*a* is received in the first receiving space S1, as illustrated in FIG. 4. That is, when the latch 300 is non-removably retained to the insulative housing 103, the end portion face 103*c*, the portion of the third face 103*e* proximate to the end portion face 103*c*, and the portion of the fourth face 103*f* proximate to the end portion face 103*c*, which may define the end portion 105*a*, may be surrounded by the slot 303. In this manner, the latch 300 can snap tightly onto the end portion 105*a*, such that the retention of the latch 300 to the insulative housing 103 may be improved, thereby improving the reliability of the card edge connector 100 for connecting the first circuit board 3.

Figure 6:
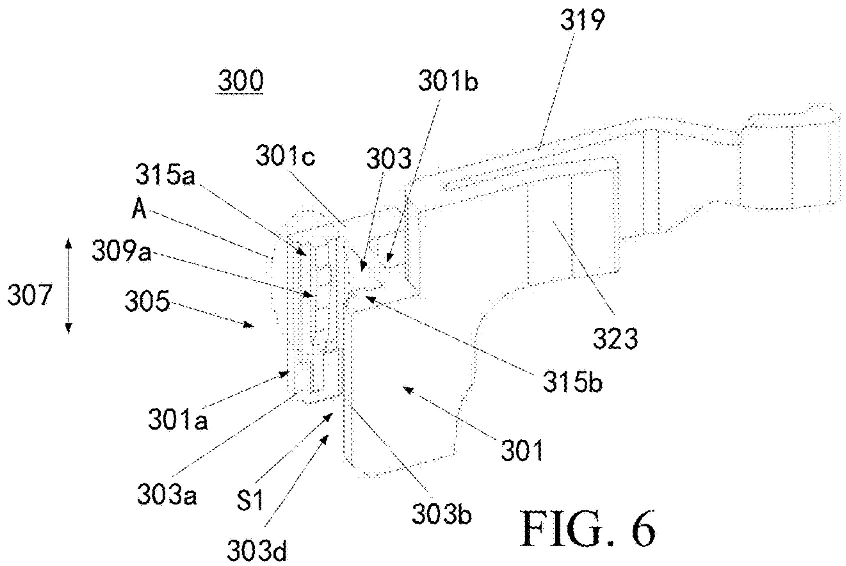
FIG. 6 is a perspective view of a latch of the card edge connector of FIG. 3.
Figure 7:
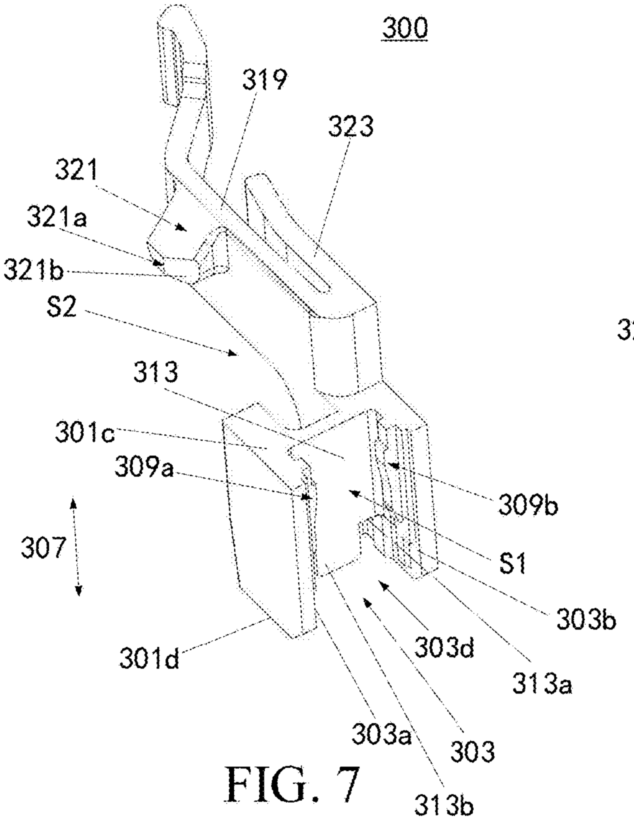
FIG. 7 is another perspective view of the latch of FIG. 6.
Figure 8:
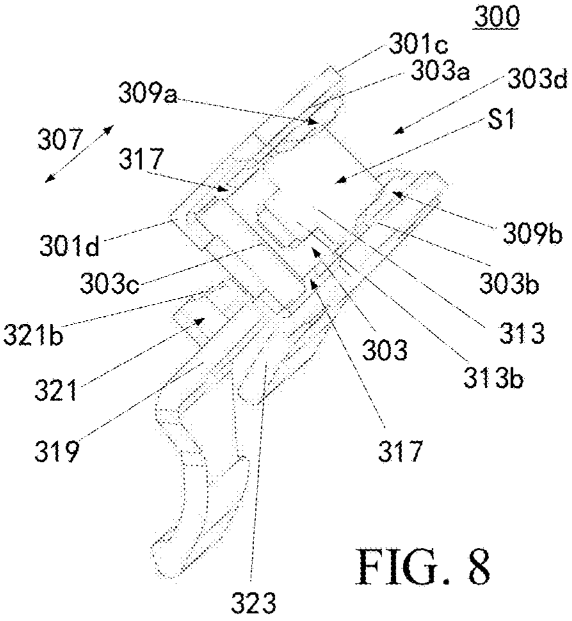
FIG. 8 is a yet another perspective view of the latch of FIG. 6.
Figure 9:
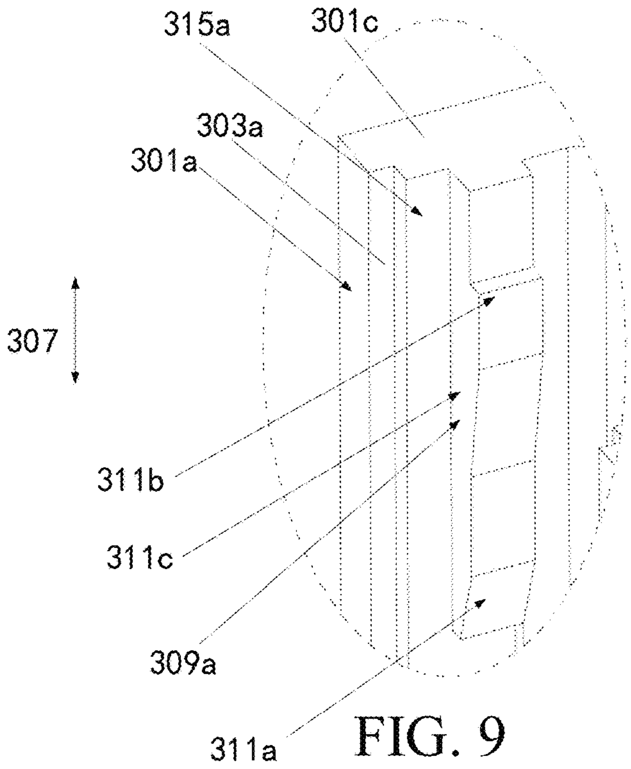
FIG. 9 is an enlarged view of a circled portion of the latch marked "A" in FIG. 6.

FIGS. 6 to 10 schematically illustrate the latch 300, in which FIG. 6 is a perspective view of the latch 300, FIG. 7 is another perspective view of the latch 300, FIG. 8 is yet another perspective view of the latch 300, FIG. 9 is an enlarged view of a circled portion A in FIG. 6, and FIG. 10 is a cross sectional view of the card edge connector 100 along line I-I of FIG. 4. The slot 303 of the latch 300 may extend along a first direction 307 and include mutually opposed first and second inner sidewalls 303*a* and 303*b*, and an end wall 303*c* connecting the first inner sidewall 303*a* and the second inner sidewall 303*b*. The slot 303 may be configured to allow the end portion 105*a* to enter the slot 303 when the latch 300 is oriented with the first direction 307 being substantially parallel to the mating direction 107. The body 301 may include a top face 301*c* and a bottom face 301*d* opposite to each other in the first direction 307. In some examples, as shown in FIGS. 6, 7, 8 and 10, the slot 303 may extend through the body 301 from the top face 301*c* along the first direction 307 to the bottom face 301*d*.

With continuing reference to FIGS. 6 to 10, the first retention feature 305 includes a first rib 309*a* and a second rib 309*b* protruding into the first receiving space S1 from the first inner sidewall 303*a* and the second inner sidewall 303*b*, respectively. The first rib 309*a* and the second rib 309*b* extend parallelly to the first direction 307, respectively. Turning to FIGS. 11 and 12, the second retention feature 111 includes a first groove 115*a* and a second groove 115*b* recessed into the insulative housing 103 at the end portion 105*a*. As shown in FIGS. 1 to 5 and FIG. 10, when the end portion 105*a* enters the slot 303 and slides a predetermined distance in the slot 303, the first rib 309*a* is received in the first groove 115*a* and the second rib 309*b* is received in the second groove 115*b*, so as to form an upper stop for blocking the latch 300 from moving back in the mating direction 107. Also, this "rib-groove" fitting manner may provide a guiding feature to guide the latch 300 to advance in the mating direction 107 on the end portion 105*a*. In addition, this "rib-groove" fitting manner enables the latch 300 to snap tightly and securely onto the end portion 105*a* when the latch 300 is mounted to the insulative housing 103, thereby providing a non-removable connection between the latch 300 and the insulative housing 103.

As illustrated in FIGS. 9 and 10, each of the first rib 309*a* and the second rib 309*b* may include a leading end 311*a*, a trailing end 311*b* opposite to the leading end 311*a*, and a rib body 311*c* extending between the leading end 311*a* and the trailing end 311*b*. The leading end 311*a* is closer to an access 303*d* of the slot 303 than the trailing end 311*b*, such that when the end portion 105*a* enters the slot 303 and slides in the slot 303, the leading end 311*a* enters a corresponding groove of the first groove 115*a* and the second groove 115*b* before the trailing end 311*b*. The shapes of the trailing end 311*b* and the corresponding groove are configured to restrain the trailing end 311*b* from moving back out of the corresponding groove after the trailing end 311*b* enters the corresponding groove. In some examples, as illustrated in FIGS. 9 and 10, the trailing end 311*b* may be configured to have stepped portions to cooperate with a grooved end of the corresponding groove of the first groove 115*a* and the second groove 115*b*, thereby restraining the trailing end 311*b* from moving back out of the corresponding groove after the trailing end 311*b* enters the corresponding groove. In some examples, as best illustrated in FIGS. 9 and 10, the leading end 311*a* may be configured to have a chamfered or rounded portion to facilitate entry into the corresponding groove. In addition, in some examples, the first rib 309*a* and the second rib 309*b* may be in reflection symmetry arranged at the first inner sidewall 303*a* and the second inner sidewall 303*b*, respectively. This symmetrical design may enable substantially the same force on both sides of the slot 303 for installing the latch 300.

As shown in FIGS. 7, 8, and 10, the first retention feature 305 may include a first platform 313 protruding into the first receiving space S1 from the end wall 303*c*. Turning to FIGS. 11 and 12, the end portion 105*a* includes a second platform 117 protruding outwardly from a portion of the end portion face 103*c* proximate to the second face 103*b*. As illustrated in FIG. 10, the first platform 313 and the second platform 117 may be configured to cooperate with each other when the end portion 105*a* enters the slot 303 and slides a predetermined distance in the slot 303, so as to form a lower stop for blocking further forward movement of the latch 300 in the mating direction 107.

The aforesaid upper and lower stops cooperate with each other such that when the end portion 105*a* enters the slot 303 and slides a predetermined distance in the slot 303, the latch 300 is fixed in position and can neither move backward in the mating direction 107 nor move further forward in the mating direction 107. In addition, as described above, the "rib-groove" fitting manner enables the latch 300 to snap tightly and securely onto the end portion 105*a*, thereby preventing the latch 300 from disengaging from the end portion 105*a* in a direction other than the mating direction 107. In this manner, the latch 300 is non-removably retained to the insulative housing 103.

As shown in FIG. 7, the first platform 313 includes a first stop face 313*a*, and as shown in FIGS. 11 and 12, the second platform 117 includes a second stop face 117*a*. When the first platform 313 and the second platform 117 cooperate with each other, the first stop face 313*a* and the second stop face 117*a* are mutually opposed to and in contact with each other to block the latch 300 from moving further forward in the mating direction 107. In some examples, the first platform 313 may include a first tab 313*b* protruding from the first stop face 313*a*, and the second platform 117 includes a first recess 117*b* recessed into the second platform 117 from the second stop face 117*a*. The first tab 313*b* and the first recess 117*b* are configured such that the first tab 313*b* is received in the first recess 117*b* when the first platform 313 and the second platform 117 cooperate with each other, so as to enhance retention of the latch 300 to the insulative housing 103. It should be appreciated that in some other examples, the first platform 313 may include a second recess (not shown) recessed into the first platform 313 from the first stop face 313*a*, and the second platform 117 may include a second tab (not shown) protruding from the second stop face 117*a*. The second tab and the second recess are configured such that the second protrusion is received in the second recess when the first platform 313 and the second platform 117 cooperate with each other, so as to enhance retention of the latch 300 to the insulative housing 103.

Alternatively or additionally, in some examples, the first retention feature 305 may include at least one first additional rib protruding into the first receiving space S1 from at least one of the first inner sidewall 303*a* and the second inner sidewall 303*b*, with each of the at least one first additional rib extending parallelly to the first direction 307. In such examples, the second retention feature 111 further comprises at least one first additional groove recessed into the insulative housing 103 at the end portion 105*a*. Each of the at least one first additional rib and a corresponding one of the at least one first additional groove may be configured to cooperate with each other when the end portion 105*a* enters the slot 303 and slides a predetermined distance in the slot 303, so as to enhance retention of the latch 300 to the insulative housing 103.

In one of such examples, as shown in FIGS. 6, 9, and 10, the at least one first additional rib includes two first additional ribs 315*a* and 315*b* protruding into the first receiving space S1 from the first inner sidewall 303*a* and the second inner sidewall 303*b*, respectively. The first rib 309*a* protrudes into the first receiving space S1 from a top of one 315*a* of the two first additional ribs, and the second rib 309*b* protrudes into the first receiving space S1 from a top of the other 315*b* of the two first additional ribs. In this example, as shown in FIGS. 11 and 12, the at least one first additional groove includes two first additional grooves 119*a* and 119*b*, and the first groove 115*a* and the second groove 115*b* are recessed into the insulative housing 103 from a bottom of a corresponding additional groove of the two first additional groove 119*a* and 119*b*. This stepped rib combination may enable the first rib 309*a* and the second rib 309*b* to snap more deeply into the insulative housing 103 and provide a larger snap engagement area between the first rib 309*a* and the second rib 309*b* and the insulative housing 103, thereby further enhancing the retention of the latch 300 to the insulative housing 103.

Alternatively or additionally, in some examples, as shown in FIG. 8, the first retention feature 305 may include at least one second additional rib 317 protruding into the first receiving space S1 from at least one of the first inner sidewall 303*a* and the second inner sidewall 303*b*, with each of the at least one second additional rib 317 extending parallelly to the first direction 307. In such examples, the second retention feature 111 may include at least one second additional groove 121 recessed into the second platform 117. Each of the at least one second additional rib 317 and a corresponding one of the at least one second additional groove 121 are configured to cooperate with each other when the end portion 105*a* enters the slot 303 and slides a predetermined distance in the slot 303, so as to enhance the retention of the latch 300 to the insulative housing 103.

As shown in FIGS. 1 to 8 and 10, the latch 300 may include a primary beam 319, which may be configured to move between a rest position for locking a card and a biased position for removing the card. The primary beam 319 may be configured to be elastic. As illustrated, the primary beam 319 may be cantilevered from a second side 301*b* of the body 301 opposite to the first side 301*a*. The second side 301*b* of the body 301 and the primary beam 319 may together define a second receiving space S2. Turning back to FIG. 2, the first circuit board 3 includes a locking portion 11 having a first surface 11*a*, and a notch 11*b* recessed into the locking portion 11 from the first surface 11*a*. The locking portion 11 may be configured to be positioned in the second receiving space S2 with the first surface 11*a* facing the primary beam 319 when the first circuit board 3 is inserted into the slot 109.

Figure 13:
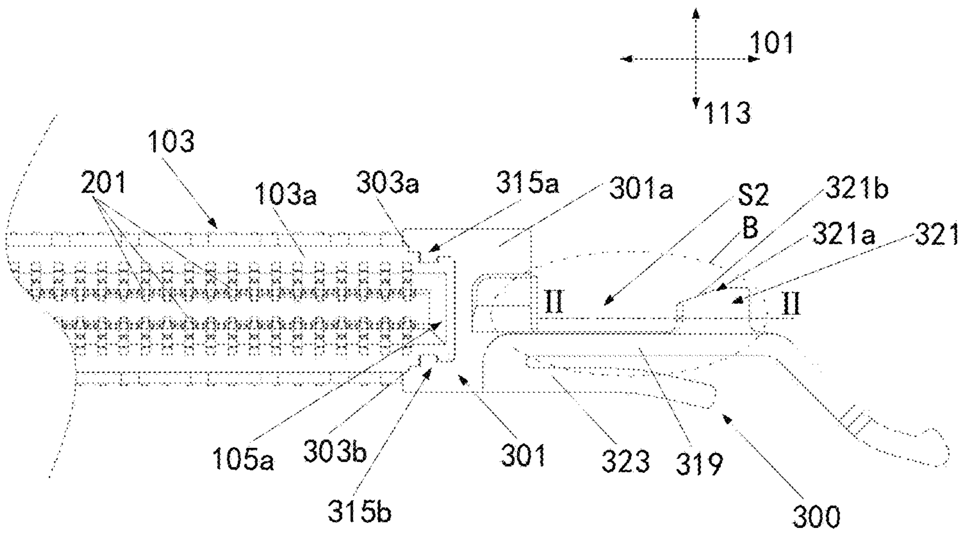
FIG. 13 is a partial top view of the card edge connector of FIG. 3, showing a primary beam of the latch in a rest position.
Figure 14:
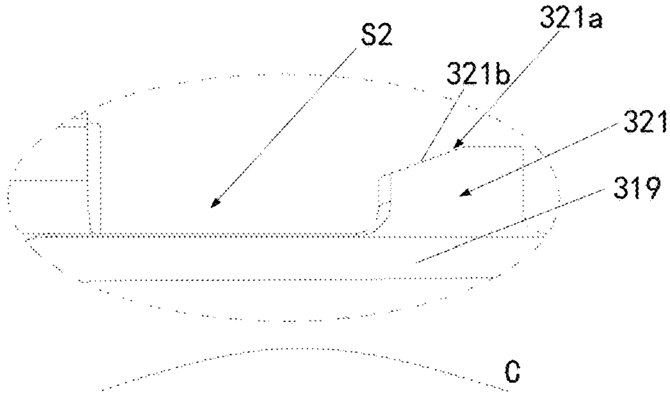
FIG. 14 is an enlarged view of a circled portion of the card edge connector marked "B" in FIG. 13.
Figure 15:
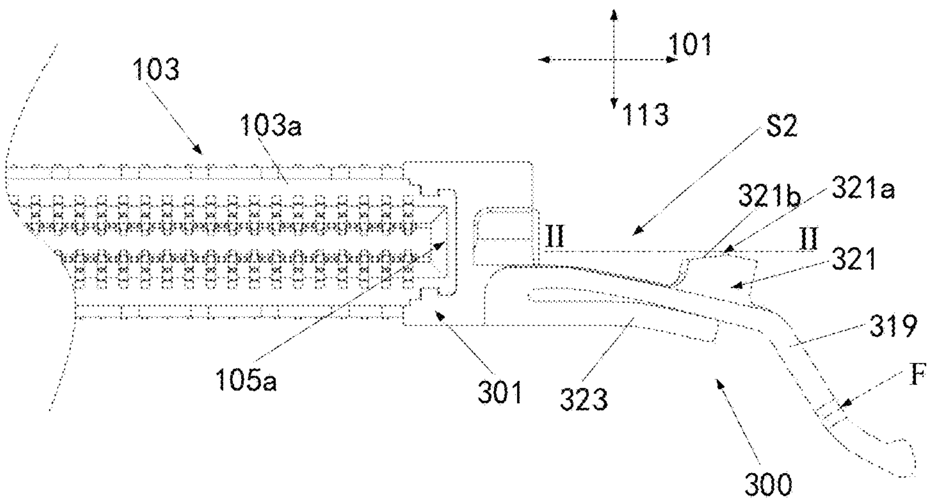
FIG. 15 is another partial top view of the card edge connector of FIG. 3, showing the primary beam of the latch in a biased position.

The primary beam 319 of the latch 300 is illustrated in further detail in FIGS. 13 to 15. The primary beam 319 may include a locking protrusion 321 protruding into the second receiving space S2 from the primary beam 319. The primary beam 319 may be configured to be moved from a rest position (FIG. 13) to a biased position (FIG. 15) under a force F (as indicated schematically by the dashed arrow in FIG. 15), and to return back to the rest position from the biased position under the action of its own elasticity after the force is withdrawn. It should be appreciated that in the rest position as shown in FIG. 13, the locking protrusion 321 is positioned in the notch 11*b*, thereby cooperating with the notch 11*b* to block the first circuit board 3 from being pulled out of the slot 109 along the mating direction 107. In the biased position as shown in FIG. 15, the locking protrusion 321 is positioned to exit from the notch 11*b*, thereby allowing the first circuit board 3 to be pulled out of the slot 109 along the mating direction 107.

As shown in FIGS. 7, 8, 10, and 13 to 15, the locking protrusion 321 has a protruding tip 321*a* configured to exit from the notch 11*b* after remaining portions of the locking protrusion 321 when the primary beam 319 is biased from the rest position to the biased position, and to enter the notch 11*b* before the remaining portions of the locking protrusion 321 when the primary beam 319 returns to the rest position from the biased position. The protruding tip 321*a* is formed with a first chamfered portion, which may be defined by a first chamfered face 321*b*. The first chamfered face 321*b* is inclined relative to the first surface 11*a* (as shown in FIG. 2 and schematically indicated by the dashed line II-II in FIGS. 13 and 15). When the primary beam 319 is in the rest position, the first chamfered face 321*b* is substantially parallel to and coplanar with the first surface 11*a*. When the primary beam 319 is in the biased position, and the angle between the first chamfered face 321*b* and the first surface 11*a* gradually becomes smaller when the primary beam 319 is biased to the biased position from the rest position. With the use of the first chamfered portion, the angle of deflection of the primary beam 319 around the joint of the primary beam 319 and the body 301 when biased to the biased position from the rest position can be reduced as compared to conventional designs. The reduced deflection angle can in turn reduce the extent to which the primary beam 319 is biased, thereby increasing the service life of the primary beam 319.

In some examples, a section of the primary beam 319 between the body 301 and the locking protrusion 321 is curved in a direction away from the second receiving space S2, as schematically represented by the arc C shown in FIG. 14. In this manner, the flexibility of the primary beam 319 can be improved, thereby increasing the service life of the primary beam 319.

In some examples, the latch 300 further comprises an assistant beam 323 cantilevered from the second side 301*b* on a side of the primary beam 319 facing away from the second receiving space S2. The assistant beam 323 may be configured to restrain the primary beam 319 from being further biased after the primary beam 319 is biased to the biased position from the rest position. In this manner, it is possible to prevent the primary beam 319 from being over-biased, thereby increasing the service life of the primary beam 319.

In some embodiments, the body 301 and the primary beam 319 of the latch 300 may be formed of materials of similar properties, which may provide easier manufacturing process. In some embodiments, the body 301 and the primary beam 319 of the latch 300 may be formed of materials of different properties, which may be configured to be more suitable for their respective functions. For example, the body 301 may be formed of a first material, and the primary beam 319 may be formed of a second material. The first material may be more rigid than the second material to provide a reliable snap onto the insulative housing 103. The body 301 and primary beam 319 may be formed as an integral part by using a secondary injection molding technique with the first and second materials.

The rigidity of the insulative housing 103 may be greater than that of the latch 300. In other words, the latch 300 may be more flexible than the insulative housing 103. In this manner, the insulative housing 103 may be configured to be rigid enough to avoid excessive deformation during insertion of the first circuit board 3 into the slot 109 of the insulative housing 103, and the latch 300 may be configured to be flexible enough to be suitable for frequent operation (i.e., unlocking and locking) without damage. The rigidity of the insulative housing 103 being greater than that of the latch 300 may also help prevent the latch 300 from being loosen and thus disengaged from the insulative housing 103 due to excessive deformation of the insulative housing 103 during insertion of the first circuit board 3 into the slot 109 of the insulative housing 103. In some examples, the insulative housing 103 and the latch 300 may be formed from different materials. In some embodiments, the insulative housing 103 may be formed of a first material and the latch 300 may be formed of a second material, and the first material may have a greater rigidity than the second material. In other words, the second material may be more flexible than the first material. For example, the flexural modulus of the first material may be not less than 10 GPa (e.g., 10 GPa, 10.5 GPa, 11 GPa, or higher), and the flexural modulus of the second material may be not more than 7.5 GPa (e.g., 7.5 GPa, 7.3 GPa, 7 GPa, or lower). As used herein, the flexural modulus refers to the ratio of the flexural stress to the deformation caused by the flexural of the material during flexural deformation. The flexural modulus is an indicator used to characterize the rigidity of a material; the higher the flexural modulus of a material, the greater the rigidity. In addition, in some examples, the tensile elongation of the second material is not higher than 7% (e.g., 7%, 6%, or less). As used herein, the tensile elongation is a ratio in percentage of the amount of elongation of an original scale of a material after tensile breakage thereof to the original scale. The tensile elongation is an indicator used to characterize both elastic deformation and plastic deformation of a material. That is, the tensile elongation of the latch 300 is not higher than 7%, i.e., the ratio of the elongation of the original scale of the latch 300 after being elongated and broken to the original scale is not higher than 7%. It should be appreciated that, the insulative housing 103 and the latch 300 may also be manufactured in any other suitable manner known in the art, so that the rigidity of the insulative housing 103 is greater than that of the latch 300.

The inventor has also recognized that in the case where the card edge connector 100 is a surface mount connector, the card edge connector 100 with the latch 300 should be able to sustain the heat generated during mounting of the card edge connector 100 to the aforementioned second circuit board (not shown). As illustrated, the card edge connector 100 is configured to be mounted to the second circuit board through a surface mount technology, and the tail portions 203 of the plurality of conductive elements 200 are surface mount contact tails for establishing an electrical connection with a second (corresponding) conductive portion (such as a pad) of the second circuit board through, for example, a reflow soldering process. During the mounting, the second circuit board is heated to a temperature high enough to cause reflow of the solder. After the heating is finished, the card edge connector 100 is mounted to the second circuit board such that an electrical connection is established between the tail portions 203 of the plurality of the conductive elements 200 and the second (corresponding) conductive portion of the second circuit board. The relative high temperature of the second circuit board (typically may be 260° C. or higher) may cause the insulative housing 103 and the latch 300 to melt. In this case, both the insulative housing 103 and the latch 300 are configured to withstand a temperature of at least 260° C. to protect the insulative housing 103 and the latch 300 from melting during mounting of the card edge connector 100 to the second circuit board. For example, both the aforementioned first and second materials are materials that can withstand a temperature of at least 260° C.

In order to ensure that the latch 300 is suitable for frequent operation (i.e., unlocking and locking) without damage and to avoid melting during mounting of the card edge connector 100 to the second circuit board, the second material should meet the following conditions: (1) the flexural modulus thereof is not higher than 7.5 GPa; (2) the tensile elongation thereof is not higher than 7%; and (3) a temperature of at least 260° C. (i.e., melting point not lower than 260° C.) can be withstood. An example of such a material may be GF 20% reinforced PA46 (or referred to as "PA46 with 20 Glass fiber"), for example, Stanyl® HFX31S available from DSM. Such material is easy to be processed and therefore cost-effective. In addition, it should be appreciated that the second material may also be any other suitable material known in the art.

The present disclosure has been described through the above embodiments, but it should be understood that a variety of variations, modifications and improvements may be made by a person skilled in the art according to the teaching of the present disclosure, and these variations, modifications and improvements fall within the spirit of the present disclosure and the claimed scope of protection of the present disclosure. The scope of protection of the present disclosure is defined by the appended claims and its equivalent scope. The above embodiments are for the purpose of illustration and description, and may not intend to limit the present disclosure to the scope of the described embodiments.

Various variations may be made to the structures illustrated and described herein. For example, although the latch is described in connection with the latch 300 mounted at the end portion 105*a* of the insulative housing 103, it should be appreciated that a latch may be similarly provided at the end portion 105*b* of the insulative housing 103.

As another example, although the plurality of conductive elements 200 are illustrated in the figures as being arranged in two rows, the present disclosure is not limited thereto and a connector may have one terminal row or more than two rows.

Moreover, as although many creative aspects have been described above with reference to a vertical connector, it should be understood that the aspects of the present disclosure may not be limited thereto. Any one of the creative features, whether alone or combined with one or more other creative features, may also be used for other types of electrical connectors, such as right-angle connectors or any other suitable type of connectors.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way may be interchanged as appropriate, so that the embodiments of the present disclosure described herein may be implemented in a sequence other than those illustrated or described herein.

What is claimed is:

1. An electrical connector, comprising:

a housing comprising a slot extending in a longitudinal direction and an end portion at an end of the slot in the longitudinal direction;

a plurality of conductive elements held in the housing, each of the plurality of conductive elements comprising a contact portion exposed in the slot and a tail portion extending out of the housing; and a latch comprising a body non-removably retained to the end portion of the housing, a first beam comprising a proximal end joining the body, a distal end, a protrusion extending from a first side of the first beam and having a chamfered face, and a curved face on a second side opposite the first side and extending between the proximal end and the protrusion, and a second beam configured to protect the first beam from excessive deformation, the second beam comprising a proximal end joining the body of the latch and a distal end aligned with the protrusion of the first beam in a direction perpendicular to the longitudinal direction.

2. The electrical connector of claim 1, wherein:

the body of the latch comprises a first sidewall, a second sidewall, an end wall joining the first sidewall and the second sidewall, and a first retention feature;

the end portion of the housing is at least partially enclosed by the first sidewall, second sidewall, and end wall of the body of the latch; and the end portion of the housing comprises a second retention feature configured to engage the first retention feature of the body of the latch so as to non-removably retain the body of the latch to the end portion of the housing.

3. The electrical connector of claim 2, wherein:

the housing comprises a mating face and a mounting face, the slot opens through the mating face, and the tail portions of the plurality of conductive elements extend out of the mounting face; and the first retention feature of the latch comprises a rib protruding from the first sidewall and disposed above the mounting face, and the rib comprises a stepped portion disposed below the mating face.

4. The electrical connector of claim 3, wherein:

the second retention feature of the housing comprises a groove configured to receive the rib of the first retention feature; and the rib of the first retention feature of the latch comprises a chamfered or rounded portion configured to guide the rib of the first retention feature of the latch into the groove of the second retention feature of the housing.

5. The electrical connector of claim 3, wherein:

the first retention feature of the latch comprises a rib protruding from the second sidewall; and the rib protruding from the first sidewall and the rib protruding from the second sidewall are in reflection symmetry.

6. The electrical connector of claim 3, wherein:

the first retention feature comprises a first platform protruding from the end wall; and the housing comprises a second platform protruding outward from the end portion and configured to engage the first platform of the first retention feature.

7. The electrical connector of claim 6, wherein:

the first platform comprises a first stop face and a tab protruding from the first stop face;

the second platform comprises a second stop face and a recess into the second platform from the second stop face; and the tab of the first platform and the recess of the second platform are configured to engage each other when the first stop face engages the second stop face.

8. The electrical connector of claim 3, wherein:

the first retention feature comprises a first additional rib protruding from the first sidewall and aligned with the rib in a mating direction perpendicular to the longitudinal direction, and a second additional rib protruding from the first sidewall and offset from the rib in the mating direction; and the second retention feature comprises matching additional grooves configured to receive the first additional rib and the second additional rib, respectively.

9. The electrical connector of claim 1, wherein:

the housing and the latch are made of different materials, a first material of the housing is more rigid than a second material of the latch;

the first material has a flexural modulus of not less than 10 GPa; and the second material has a flexural modulus of not more than 7.5 GPa.

10. The electrical connector of claim 9, wherein:

the tail portions of the plurality of conductive elements are configured for surface mount; and both the first material and the second material have melting points no less than 260° C.

11. A method of manufacturing an electrical connector comprising a housing comprising a mating face, a mounting face, a slot extending in a longitudinal direction and an end portion at an end of the slot in the longitudinal direction, a plurality of conductive elements held in the housing, each of the plurality of conductive elements comprising a contact portion exposed in the slot and a tail portion extending out of the housing, and a latch comprising a body, the body comprising a first sidewall, a second sidewall, an end wall joining the first sidewall and the second sidewall, a first retention feature comprising a first platform protruding from the end wall, the first platform comprising a first stop face and a tab protruding from the first stop face, and a beam comprising a proximal end joining the body and a distal end, wherein the housing comprises a second platform protruding outward from the end portion and configured to engage the first platform of the first retention feature, the second platform comprising a second stop face and a recess into the second platform from the second stop face, the method comprising:

aligning the latch with the end portion of the housing such that the first sidewall, the second sidewall, and the end wall of the latch at least partially enclosing the end portion of the housing when the latch is installed to the housing; and engaging the latch with the end portion of the housing until the latch cannot be removed from the end portion of the housing in a non-destructive manner, wherein engaging the latch with the end portion of the housing comprises engaging the first stop face of the first platform of the first retention feature of the body of the latch with the second stop face of the second platform of the housing so as to engage the tab of the first platform with the recess of the second platform.

12. The method of claim 11, wherein engaging the latch with the end portion of the housing comprises sliding the latch in a mating direction perpendicular to the longitudinal direction.

13. The method of claim 11, wherein engaging the latch with the end portion of the housing comprises engaging a first retention feature of the latch with a second retention feature of the end portion of the housing.

14. The method of claim 13, wherein engaging the first retention feature of the latch with the second retention feature of the end portion of the housing comprises sliding a chamfered portion of the first retention feature of the latch into the second retention feature of the end portion of the housing; and fitting a stepped portion of the first retention feature of the latch into a corresponding portion of the second retention feature of the end portion.

15. An electrical connector, comprising:

a housing comprising a slot extending in a longitudinal direction, and an end portion disposed at an end of the slot in the longitudinal direction;

a plurality of conductive elements held in the housing, each of the plurality of conductive elements comprising a contact portion exposed in the slot and a tail portion extending out of the housing, the tail portions of the plurality of conductive elements are configured for surface mount; and a latch comprising a body retained to the end portion of the housing, and a beam comprising a proximal end joining the body and a distal end, wherein:

the housing and the latch are made of different materials, a first material of the housing is more rigid than a second material of the latch, and both the first material and the second material have melting points no less than 260° C.; and the first material has a flexural modulus of not less than 10 GPa, and the second material has a flexural modulus of not more than 7.5 GPa.

16. The electrical connector of claim 15, wherein:

the beam comprises a protrusion extending from a first side of the beam and having a chamfered face; and the beam comprises a curved face on a second side opposite the first side and extending between the proximal end and the protrusion.

17. The electrical connector of claim 16, wherein:

the beam is a first beam;

the latch comprises a second beam configured to protect the first beam from excessive deformation; and the second beam comprises a proximal end joining the body of the latch and a distal end aligned with the protrusion of the first beam in a direction perpendicular to the longitudinal direction.

18. The electrical connector of claim 15, wherein:

the second material has a tensile elongation of not more than 7%.

19. The electrical connector of claim 15, wherein:

the second material is GF 20% reinforced PA46.

20. The electrical connector of claim 15, wherein:

the body of the latch comprises a space configured to receive the end portion of the housing and a first retention feature protruding into the space; and the end portion of the housing comprises a second retention feature configured to engage the first retention feature so as to non-removably retain the latch to the housing.

* * * * *